United States Patent [19]

Braillon

[11] 4,075,589
[45] Feb. 21, 1978

[54] MAGNETIC PLATE COMPRISING PERMANENT MAGNETS AND ELECTROPERMANENT MAGNETS

[76] Inventor: Philibert Maurice Braillon, 2, rue d'Alexandry, Chambery, Savoie, France

[21] Appl. No.: 747,206

[22] Filed: Dec. 3, 1976

[30] Foreign Application Priority Data

Dec. 4, 1975 France .................................. 75 37873

[51] Int. Cl.$^2$ .............................................. H01F 7/20
[52] U.S. Cl. ....................................... 335/286; 335/289
[58] Field of Search ............... 335/285, 286, 287, 288, 335/289, 290, 291, 292, 294, 229, 230, 231

[56] References Cited

U.S. PATENT DOCUMENTS

| | | | |
|---|---|---|---|
| 1,853,471 | 4/1932 | Storch ................................... | 335/286 |
| 2,882,458 | 4/1959 | Anderson et al. .................... | 335/289 |
| 3,340,442 | 9/1967 | Braillon ................................. | 335/290 |
| 3,671,893 | 6/1972 | Edgar et al. .......................... | 335/229 |

Primary Examiner—Harold Broome
Attorney, Agent, or Firm—Karl F. Ross

[57] ABSTRACT

A magnetic plate or holder, especially for machine tools, of the type in which a magnetically attractable workpiece can be retained by magnetic force on the plate for a machining process, e.g. surface grinding, comprises a pole plate, a frame of soft magnetic material and a sole plate of soft magnetic material. Within the frame there is disposed a stack of alternately hard magnetic material, magnets of high coercive force and magnetic cores of low coercive force provided with respective energizing coils. In the inoperative position of the system, the electromagnetic cores are magnetized opposite the high-coercive-force hard magnetic members and, in the inoperative position of the magnetic plate, the magnetic cores are magnetized in the same sense as the hard magnetic bodies, thereby closing a magnetic short circuit field through the stack, the frame and the sole plate.

8 Claims, 3 Drawing Figures

MAGNETIC PLATE COMPRISING PERMANENT MAGNETS AND ELECTROPERMANENT MAGNETS

FIELD OF THE INVENTION

The present invention relates to a magnetic plate and, more particularly, to a magnetic holder for workpieces and the like, especially for use in machine tools and wherever a workpiece is to be retained for a machining operation, e.g. surface grinding.

BACKGROUND OF THE INVENTION

Magnetic plates or chucks for retention of a magnetically attractable workpiece, e.g. an iron or steel workpiece, are commonly used in surface grinding and other machines in which a vise-like or clamp-type gripping of the workpiece is undesirable because the jaws of the vise, clamp or the like would interfere with the machining operation or difficulties may be encountered in engaging or disengaging the vise-like structures.

Such magnetic plates have been of three basic types heretofore. For example, they may be provided exclusively with permanent magnets which are mechanically moved toward and away from a mounting plate on which the workpiece is disposed. The disadvantage of this system, of course, is that considerable force is necessary to break the magnetic attraction with which the permanent magnets retain the workpiece. Thus the operation of this type of device, its construction and its adjustment can be rather complicated.

In still another arrangement, a pole plate is provided at the top of the magnetic holder, a sole plate of soft magnetic material is provided as the base and a housing is disposed between the pole plate and the sole plate and encloses an array of fixed-magnetic-sense permanent magnets and variable-magnetic-sense electromagnets, i.e. so-called electropermanent magnets which retain the magnetic sense in which they are set by the application of an electrical pulse through a coil surrounding these magnets. Magnetic holders of this type are the basis for the present improvement.

Mention may also be made of electromagnetic holders in which the electromagnetic force is applied by passing an electric current through the coils surrounding magnetic cores. As long as these coils remain energized, the magnetic retention field is applied. In order to disengage the workpiece, the electrical energy is disconnected and the magnets are de-energized. The disadvantage of the latter system, of course, is that a large amount of energy is required to maintain the magnetic force.

As noted above, the invention is concerned primarily with magnetic holders using magnets of the permanent and electropermanent type, since these holders have the advantage that the energized state may be established by the application of an electrical pulse to retain the workpiece by the magnetic forces of permanent magnets and without further electrical energization. The application of a reverse pulse can, however, nullify the magnetic field to permit the workpiece to be removed from the magnetic holder.

For the most part, such magnetic holders comprise permanent magnets of invariable magnetic field direction composed of a material having a high coercive force and reversible-direction magnets, which are set by pulses through respective coils, of relatively low coercive force. The magnets are disposed so that there is no danger of demagnetization of the high-coercive-force magnets by the passage of the pulses through the coils.

In one conventional system of this type, the space between two pole pieces of a magnetic core is occupied by a central magnet of the electropermanent type juxtaposed with two permanent magnets. While the magnetization of the electropermanent magnet is in the same sense as that of the two permanent magnets, the two pole pieces adjacent them become respectively North and South poles, corresponding to the operative condition of the holder. By reversing the direction of magnetization of the central magnet, the lines of force between the two permanent magnets can close through the central magnet and thus prevent any magnetic field from bridging the poles externally of the system. This corresponds to the inoperative state of the holder.

While the system just described functions effectively, it has certain disadvantages. For example, it is of complicated construction and requires careful adjustment. More particularly, it is necessary to provide sets of three magnets between two pole pieces in such spacing that air gaps are avoided between the magnets and the pole pieces. This means careful adjustment during assembly which is a particular inconvenience.

OBJECT OF THE INVENTION

It is the object of the present invention to provide a magnetic holder in which the aforedescribed disadvantages are avoided and in which the system operates with permanent and electropermanent magnets but is greatly simplified and more economical than earlier systems for the same purpose.

SUMMARY OF THE INVENTION

This object and others which will become apparent hereinafter are attained, in accordance with the present invention, in a magnetic holder which comprises, in the interior of its soft-magnetic body, a stack of magnets including magnets having all the same sense of invariable magnetization and a large coercive force alternating with other magnets of a variable direction of magnetization and a much lower coercive force, the latter magnets each being surrounded by an electric coil, the magnets being separated from one another by pole pieces of a soft magnetic material which lies in contact with the lower face of a pole plate but which are maintained at a distance above the sole plate which also consists of soft magnetic material and is in direct contact with the body of a magnetic holder.

The magnetic assembly is thus constituted by a simple stack of magnets alternating with pole pieces, this stack being mechanically maintained in position by means of fingers or projections fixed on the body of the holder of soft magnetic material so that there is no need for costly adjustment of the several parts. The principle of functioning is relatively simple and comprises energizing the coils in one or the other direction by suitable electric pulses to form a series of magnetic fields closing through air gaps between the poles of the pole plate or closing through the continuous body formed by the magnets and the pole pieces within the interior of the magnetic holder and forming a magnetic field which is shunted through the soft magnetic body and sole plate of the device.

The device is thus in its operative position when the two sets of magnets have opposing directions of magnetization and is in its inoperative state when all of the magnets have the same sense of magnetization so that the magnetic field through the magnets and pole pieces runs parallel to the pole plate.

The magnets having an invariable sense or direction of magnetization and a high coercive force are preferably of the hard-ferrite type while the magnets having a variable direction of magnetization and a much smaller coercive force are preferably of the Ticonal or Alcomax types.

BRIEF EESCRIPTION OF THE DRAWING

The above and other objects, features and advantages of the present invention will become more readily apparent from the following description, reference being made to the accompanying drawing in which.

SPECIFIC DESCRIPTION

Figure 1:
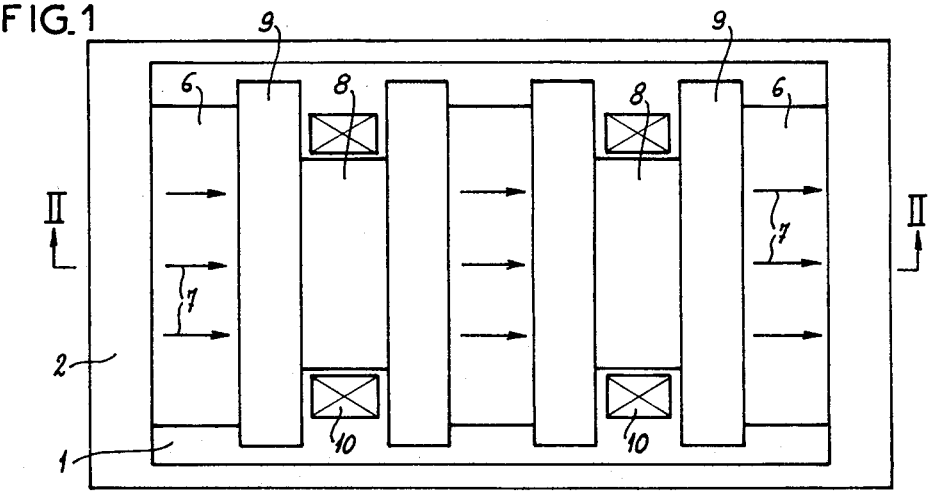
FIG. 1 is a plan view of a magnetic holder according to the invention with the pole plate removed.
Figure 2:
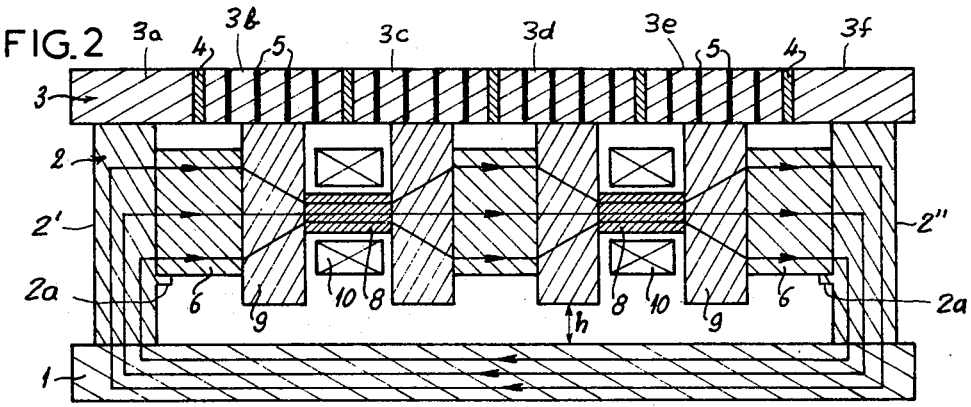
FIG. 2 is a vertical longitudinal cross section taken along the line II—II of FIG. 1 but showing the pole plate in place.
Figure 3:
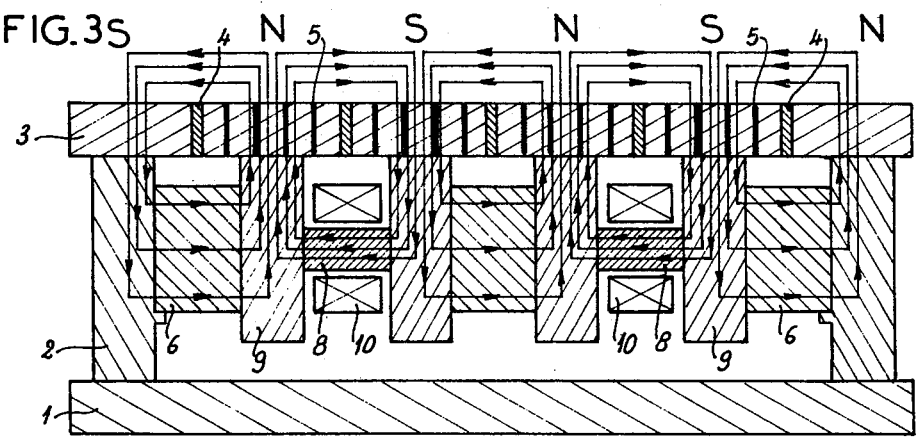
FIG. 3 is a view similar to FIG. 2 illustrating schematically the operative state of the holder, FIG. 2 illustrating the inoperative stage thereof.

The magnetic holder or plate according to the invention comprises a bed plate (sole plate) 1 of soft magnetic steel or iron, a body or frame 2 of rectangular configuration and a pole plate 3 shown removed in FIG. 1, but seen in place of FIGS. 2 and 3. The pole plate 3 comprises primary laminations 4 delimiting the different poles 3a–3f, and secondary laminations 5 disposed within each pole. The poles 3a–3f can extend across the entire width of the pole plate. The parts of the pole plate may be bonded together by welding or other means not interfering with the magnetization characteristics of the pole plate.

The invention relates mainly to the means forming the magnetic circuit and disposed within the body 2 below the sole plate 3.

According to the invention, this circuit is constituted by a stack of magnets 6 all having the same constant magnetic sense or direction (orientation) indicated by the arrows 7 in FIG. 1 (the heads of the arrows denoting North poles and the tails denoting South poles). The magnets 6 alternate with magnets 8 having a variable direction of magnetization and the two sets of magnets 6, 8, which alternate with one another, are separated by but indirect contact with pole pieces 9 of soft magnetic steel. The body of frame 2 is likewise composed of soft magnetic steel.

The permanent magnets 6 are of the high-coercive-force type, e.g. of hard ferrite, and are in direct contact with the adjacent pole piece or pole pieces 9 and, at the ends of the stack, are in direct contact with the opposite walls 2', 2" of the body 2, the latter being of soft magnetic material as previously noted.

The magnets 8 having variable directions of magnetization are permanent magnets of the low-coercive-force type, e.g. of Ticonal, and are each surrounded by an electric coil winding 10.

The pole pieces 9 which separate the magnets of the two sets are spaced apart by the same center-to-center distance as the poles of the pole plate 3 with whose lower face they are in direct contact.

All the elements 6–10 of the stack are maintained mechanically, e.g. by means of fingers or arms 2a, at a predetermined lever of distance h above the sole plate 1.

In the inoperative condition, the Ticonal magnets are always magnetized in the same direction as the hard ferrite magnets 6 by the passage of an electrical pulse through the coils 10 in a suitable sense (FIG. 2) so that the lines of magnetic force close through the stacks 6–10, the wall 2", the sole plate 1 on which the frame 2 rests and the wall 2'. Thus the stack 6–10 is magnetically short-circuited through the soft iron parts 1 and 2 and no magnetic field appears between the poles 3a–3f of the pole plate 3 which is therefore neutralized.

In the operative condition, the Ticonal magnets 8 have their magnetic fields established opposite to that of hard ferrito magnets 6 (see the arrows in FIG. 3) by the pulsed energization of coils 10 in the opposite sense. This forms so-called "dipoles" within the stack so that the pole pieces become alternately North and South magnetic poles. The poles 3a–3f are similarly magnetically polarized as represented schematically by the letters N and S in FIG. 3, indicating North and South poles, respectively.

The magnetic fields close through the air gaps between poles 3a and 3b, 3b and 3c, 3c and 3d, 3d and 3e and between poles 3e and 3f, or through a workpiece disposed on the upper surface of plate 3.

The magnetic circuits in this condition are as follows:

3a - wall 2' - magnet 6 - pole piece 9 - 3b;
3c - pole piece 9 - magnet 8 - pole piece 9 - 3b;
3c - pole piece 9 - magnet 6 - pole piece 9 - 3d;
3e - pole piece 9 - magnet 8 - pole piece 9 - 3d; and
33 - pole piece 9 - magnet 6 - wall 2" - 3f.

The sections of the two types of magnets 6, 8 are such that, at the pole plate 3, the magnetic conduction of magnets 8 is of the same order of magnitude as that of magnets 6.

As will be apparent, the invention is not limited by the single embodiment described and illustrated and can embrace all modifications within the scope of the appended claims. Naturally it is possible to elongate the device and to use a greater number of magnets as long as they retain the orientation which has been described. Furthermore, it is not necessary to use hard-ferrite magnets for the high-coercive-force magnets or Ticonal magnets for the low-coercive-force magnets as long as the magnets which are used have compatible properties with the principle of the invention. Furthermore, the invention is not limited to plates and magnetic holders or chucks, it being applicable to all supports, scales and the like, with or without upper pole plates. in which the distribution of the magnetic poles of the present invention is useful and which possess the same or a corresponding magnetic circuit.

The frame 2 can be held to the sole plate 1 and to the pole plate 3 by brass screws or other means not affecting the magnetic paths. The stacks 6–10 may be held together by throughgoing nonmagnetic bolts.

I claim:

1. A magnetic holder comprising a hollow body having:
   a pair of opposite walls of soft magnetic material;
   a sole plate underlying said body and in contact with said walls, said sole plate composed of soft magnetic material;
   a magnetic stack bridging said walls and in contact therewith, said magnetic stack comprising alternating highcoercive force magnets and low-coercive-force magnets with soft magnetic pole pieces disposed between them, said pole pieces being spaced above said sole plate; and electric coils surrounding each of said low-coercive force magnets, said high-coercive-force magnets being of invariable magnetic direction and the magnetic direction of said low-coercive-force magnets being reversible by the application of electrical pulses to said coils.

2. The holder defined in claim 1, further comprising a pole plate having respective pole regions in contact with said pole pieces, said pole plate lying in contact with said walls.

3. The holder defined in claim 2 wherein said body is formed with projections supporting said stack.

4. The holder defined in claim 3 wherein said pole plate and said sole plate are rectangular and said body is a rectangular frame received between said plates, said walls of said body being opposite walls of said frame.

5. The holder defined in claim 4 whrein said magnets of high coercive force of said stack lie in direct contact with said walls.

6. The holder defined in claim 5 wherein the pole regions of said pole plate are separated by primary laminations.

7. The holder defined in claim 6 wherein secondary laminations are disposed within each of said regions.

8. The holder defined in claim 7 wherein said magnets of high coercive force are hard-ferrite permanent magnets and said magnets of low coercive force are Ticonal or Alcomax magnets.

* * * * *